(12) United States Patent
Won et al.

(10) Patent No.: US 6,324,144 B1
(45) Date of Patent: Nov. 27, 2001

(54) APPARATUS FOR CORRECTING ASYMMETRY OF REPRODUCTION SIGNALS AND METHOD THEREFOR

(75) Inventors: Yong-Kwang Won, Kyungki-do; Jae-Seong Shim, Seoul, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/443,150

(22) Filed: Nov. 18, 1999

(30) Foreign Application Priority Data

Nov. 18, 1998 (KR) .................................................. 98-49543

(51) Int. Cl.$^7$ ...................................................... G11B 7/00
(52) U.S. Cl. ..................................... 369/59.15; 369/59.72
(58) Field of Search ............................. 369/59.12, 59.15, 369/59.22, 59.19, 59.21

(56) References Cited

U.S. PATENT DOCUMENTS 5,963,518 * 10/1999 Kobayashi et al. ............... 369/59.22

* cited by examiner

*Primary Examiner*—Nabil Hindi
(74) *Attorney, Agent, or Firm*—Staas & Halsey LLP

(57) ABSTRACT

An apparatus for correcting asymmetry existing in a reproduction signal corrects the asymmetry by signal-processing the reproduction signal from an optical disk in digital form. The asymmetry correction apparatus changes the threshold values for counting the sign bits of the reproduction signal and the asymmetry correction values although discontinuous intervals exist on the optical disc, thereby providing an effect of easily varying an adaptive speed with respect to the discontinuous signal.

43 Claims, 7 Drawing Sheets

APPARATUS FOR CORRECTING ASYMMETRY OF REPRODUCTION SIGNALS AND METHOD THEREFOR

CROSS-REFERENCE TO RELATED APPLICATIONS

This application claims the benefit of Korean Application No. 98-49543, filed Nov. 18, 1998, in the Korean Patent Office, the disclosure of which is incorporated herein by reference.

BACKGROUND OF THE INVENTION

1. Field of the Invention

The present invention relates to an apparatus for correcting asymmetry existing in signals to be reproduced from an optical disc, and more particularly, to an apparatus for correcting asymmetry of reproduced signals through a signal processing in digital form.

2. Description of the Related Art

Digital data recorded on an optical disc exists physically in the form of pits. Since it is difficult to form the pits ideally, each length of the pits may be axially increased or decreased. This phenomenon is called an asymmetry. The asymmetry occurs due to a variety of causes such as a manufacturing process and a performance of a pickup, which is an unavoidable factor in a disc handling process. The asymmetry turns up as an asymmetry component in a reproduced signal, thereby causing accuracy of an optical disc system to be lowered.

FIG. 1 shows a reproduction signal which has been sampled from an optical disc using an optical disc system. In FIG. 1, it can be seen that a level of the sampled reproduction signal has been shifted on the vertical axis by 4V corresponding to a DC offset of +2V entirely. Accordingly, it can be seen that an asymmetry component exists in the reproduction signal.

FIG. 2 shows a conventional analog asymmetry correction apparatus for correcting asymmetry in an optical disc system. In the FIG. 2 asymmetry correction apparatus, a comparator 10 compares a signal read from an optical disc (a reproduction signal) with a feedback reference signal and outputs binary non-return-to-zero-inverted (NRZI) data. An integrator and low-pass-filter 11 calculates a digital sum value (DSV) from the binary data, removes a local peak value from the calculated DSV and feedbacks the result to the comparator 10 as a reference value. The conventional correction apparatus maintains the reference value of the comparator 10 so that the DSV of the reproduction signal is minimized and the reference level for detecting the reproduction signal is maintained to be a central value of the input reproduction signal, as shown in FIG. 1. Through the above process, the asymmetry component with respect to the reproduction signal is corrected.

The optical disc system having the analog asymmetry correction apparatus needs a digital signal detector rather than an analog signal detector, according to an increase in a recording density of the optical disc. Further, the optical disc system needs an asymmetry correction apparatus for adaptively correcting asymmetry with respect to the recorded digital signal and signal-processing the same in digital form.

However, the conventional analog asymmetry correction apparatus has limited processing speed and capacity when correcting digital signal asymmetry according to an increase in a recording density on an optical disc.

Also, in the case of a DVD-RAM where a discontinuous interval exists in a reproduction signal, the conventional asymmetry apparatus does not change a time constant of an integrator at the right time in correspondence to a different amount of asymmetry at every interval. Further, when a short interval such as a header interval exists, the conventional asymmetry correction apparatus has the difficulty in changing a time constant of the integrator in a timely fashion.

SUMMARY OF THE INVENTION

To solve the above problems, it is an object of the present invention to provide an asymmetry correction apparatus for signal-processing signals to be reproduced from an optical disk in digital form.

Additional objects and advantages of the invention will be set forth in part in the description which follows and, in part, will be obvious from the description, or may be learned by practice of the invention.

To accomplish the above and other objects and advantages of the present invention, there is provided a reproduction signal asymmetry correction apparatus for correcting asymmetry existing in a reproduction signal to be reproduced from an optical disc, the asymmetry correction apparatus comprising:

a signal converter to convert the reproduction signal to digital form;

an adder unit to add the digital converted signal and a feedback asymmetry correction signal and, in response, generating an added signal as an asymmetry corrected signal;

a counter unit for performing a counting operation of the added signal output from the adder unit to generate a counted value, comparing the counted value with a predetermined threshold value, and generating and outputting an asymmetry correction control signal to control asymmetry correction according to the comparison; and an asymmetry corrector to generate an asymmetry correction signal according to the asymmetry correction control signal and feeding the asymmetry correction signal back to the adder unit.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE PREFERRED EMBODIMENTS

Figure 1:
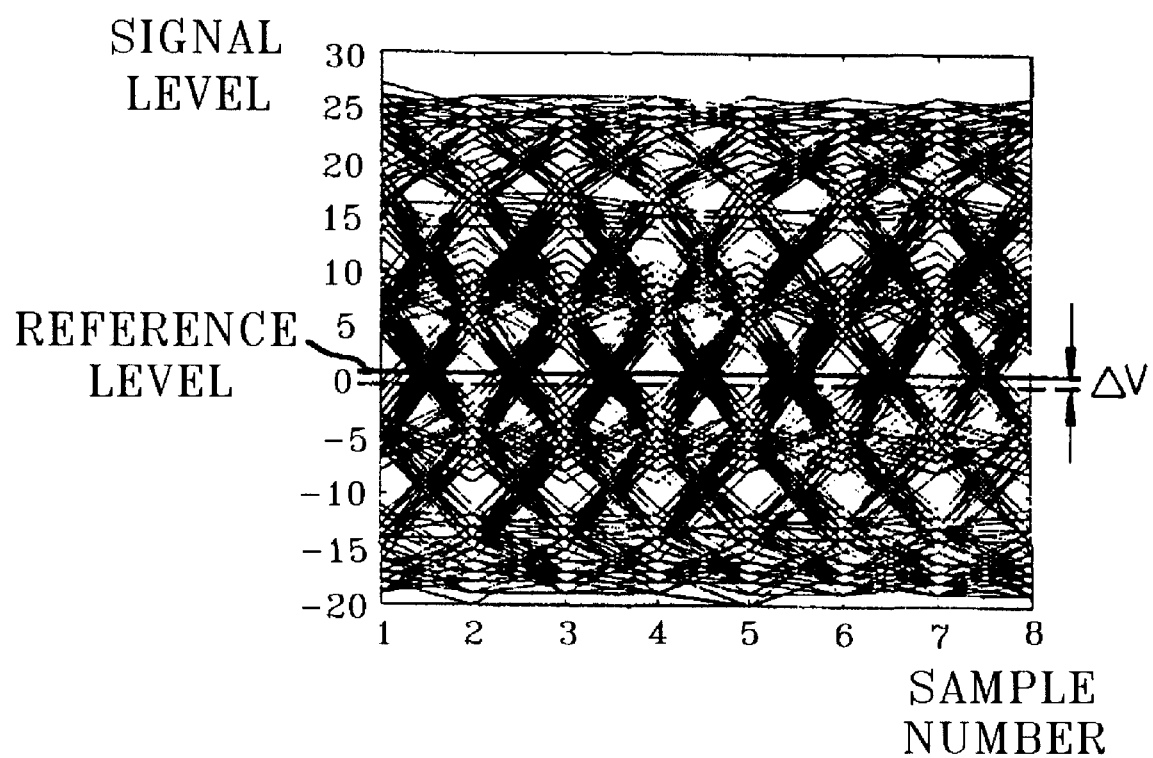
FIG. 1 shows a reproduction signal which has been sampled from an optical disc using a conventional optical disc system.
Figure 2:
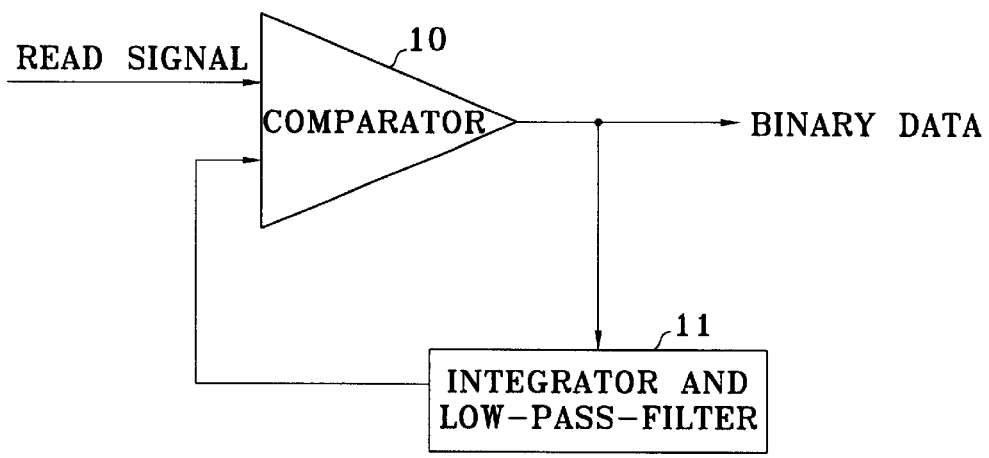
FIG. 2 shows a conventional analog asymmetry correction apparatus for correcting asymmetry in a conventional optical disc system.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
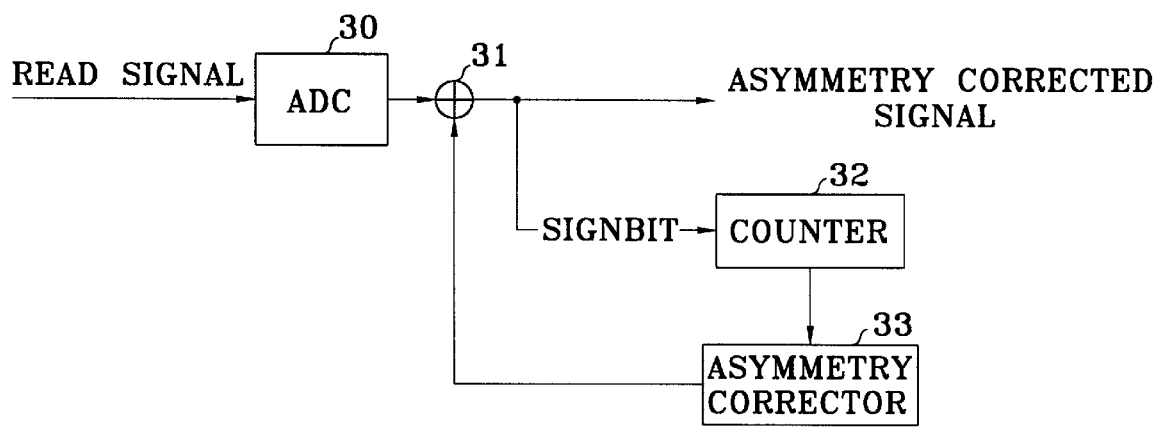
FIG. 3 is a block diagram showing an apparatus for correcting asymmetry of a reproduction signal according to a first embodiment of the present invention.

FIG. 3 is a block diagram showing an apparatus for correcting asymmetry of a reproduction signal according to a first embodiment of the present invention.

In FIG. 3, an analog-to-digital converter (ADC) 30 receives a signal (a reproduction signal) read from an optical disc (not shown) and converts the same to digital form to then output a digital conversion signal. An adder 31 adds the digital conversion signal from the ADC 30 and a predetermined feedback asymmetry correction value. The adder 31 outputs the added result to a signal detector (not shown) as an asymmetry corrected signal. A sign bit of the asymmetry corrected signal output from the adder 31 is input to a counter 32.

The counter 32 performs a counter operation with respect to the input sign bit. That is, the counter 32 increases a counted value when the input sign bit is a positive (+) value, and decreases the same when the input sign bit is a negative (−) value. The counter 32 is reset if an absolute value of the counted value is larger than a predetermined threshold value. In this case, it is judged that asymmetry correction is needed. Here, the threshold value is changed and set according to the level of the signal input to the ADC 30 and becomes a reference value for asymmetry correction. If a control value of the signal to be input to the ADC 30 is not the same as the level of the signal "0," the threshold value is changed and set as the central value thereof. The counter 32 outputs a control signal for increasing and decreasing an asymmetry correction value to an asymmetry corrector 33 if the absolute value of the counted value is larger than the threshold value. Here, if the sign of the counted value is positive (+), the counter 32 outputs a control signal for decreasing the asymmetry correction value to the asymmetry corrector 33, while if the sign of the counted value is negative (−), the counter 32 outputs a control signal for increasing the asymmetry correction value to the asymmetry corrector 33.

The asymmetry corrector 33 increases and decreases the asymmetry correction value according to the control signal applied from the counter 32 and feedback the result to the adder 31. Here, the initial asymmetry correction value of the asymmetry corrector 33 is zero. Also, the asymmetry corrector 33 can be possibly reset and held at defective intervals or blank intervals of an optical disc.

The adder 31 adds the signal output from the ADC 30 and the asymmetry correction value feedback from the asymmetry corrector 33. Accordingly, the signal which is continuously read from the optical disc is asymmetry-corrected in the above-described asymmetry correction apparatus.

Figure 4:
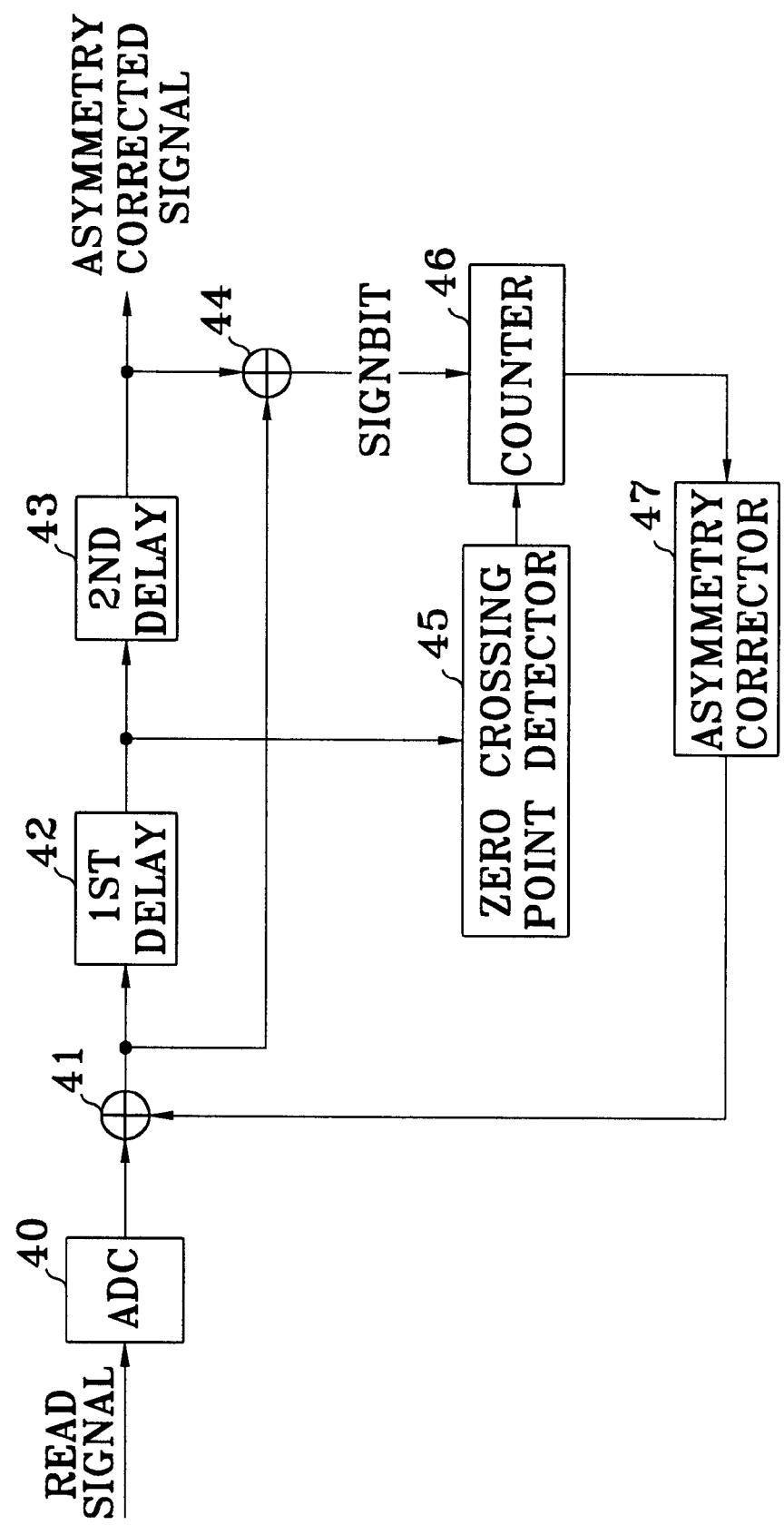
FIG. 4 is a block diagram showing an apparatus for correcting asymmetry of a reproduction signal through zero crossing point detection according to a second embodiment of the present invention.

FIG. 4 is a block diagram showing an apparatus for correcting asymmetry of a reproduction signal through zero crossing point detection according to a second embodiment of the present invention. In FIG. 4, an ADC 40 receives a signal (a reproduction signal) read from an optical disc (not shown) and converts the same to digital form to then output a digital conversion signal. A first adder 41 adds the digital conversion signal output from the ADC 40 and a predetermined feedback asymmetry correction value. The adder 41 outputs the added result to a first delay 42 and a second adder 44. The first delay 42 delays the input signal by a first predetermined time and outputs the result to a second delay 43 and a zero crossing point detector 45. The second delay 43 delays the input signal by a second predetermined time and outputs the result to a signal detector (not shown) and the second adder 44 as an asymmetry corrected signal. The second adder 44 adds the added result input from the first adder 41 and the result delayed by the second delay 43. The second adder 44 outputs the sign bit of the added signal to a counter 46.

The zero crossing point detector 45 detects a zero crossing point from the signal which has been delayed in the first delay 42 and input therefrom. If a zero crossing point is detected in the result of detection, the zero crossing point detector 45 outputs a signal for controlling a sign bit counting operation of the counter 46 to the counter 46. The counter 46 performs a counting operation with respect to the sign bit applied from the second adder 44, when an operational control signal is input from the zero crossing point detector 45. That is, the second adder 44 adds a previous signal and a following signal centered on the zero crossing point of the input signal.

Accordingly, the counter 46 increases a counted value when the sign bit input from the second adder 44 is positive (+), and decreases the former when the latter is negative (−). The counter 46 is reset if an absolute value of the counted value is larger than a predetermined threshold value. In this case, it is judged that asymmetry correction is needed. Here, the threshold value is changed and set according to the level of the signal input to the ADC 40 and becomes a reference value for asymmetry correction. The counter 46 outputs a control signal for increasing and decreasing an asymmetry correction value to an asymmetry corrector 47 if an absolute value of the counted value is larger than the threshold value. If a central value of the signal to be input to the ADC 40 is not the same as the level of the signal "0," the threshold value is changed and set as the central value thereof. Here, if the sign of the counted value is positive (+), the counter 46 outputs a control signal for decreasing the asymmetry correction value to the asymmetry corrector 47, while if the sign of the counted value is negative (−), the counter 46 outputs a control signal for increasing the asymmetry correction value to the asymmetry corrector 47.

The asymmetry corrector 47 increases and decreases the asymmetry correction value according to the control signal applied from the counter 46 and feeds the result back to the first adder 41. Here, the initial asymmetry correction value of the asymmetry corrector 47 is zero. Also, the asymmetry corrector 47 can be possibly reset and held at defective intervals or blank intervals of an optical disc.

The adder 41 adds the signal output from the ADC 40 and the asymmetry correction value fedback from the asymmetry corrector 47. Accordingly, the signals which are continuously read from the optical disc are asymmetry-corrected in the asymmetry correction apparatus.

The asymmetry correction apparatus using the zero crossing point detection is more effective in removing a DC offset due to a newly generated asymmetry, after a DC offset due to a circuitry has been removed.

Figure 5:
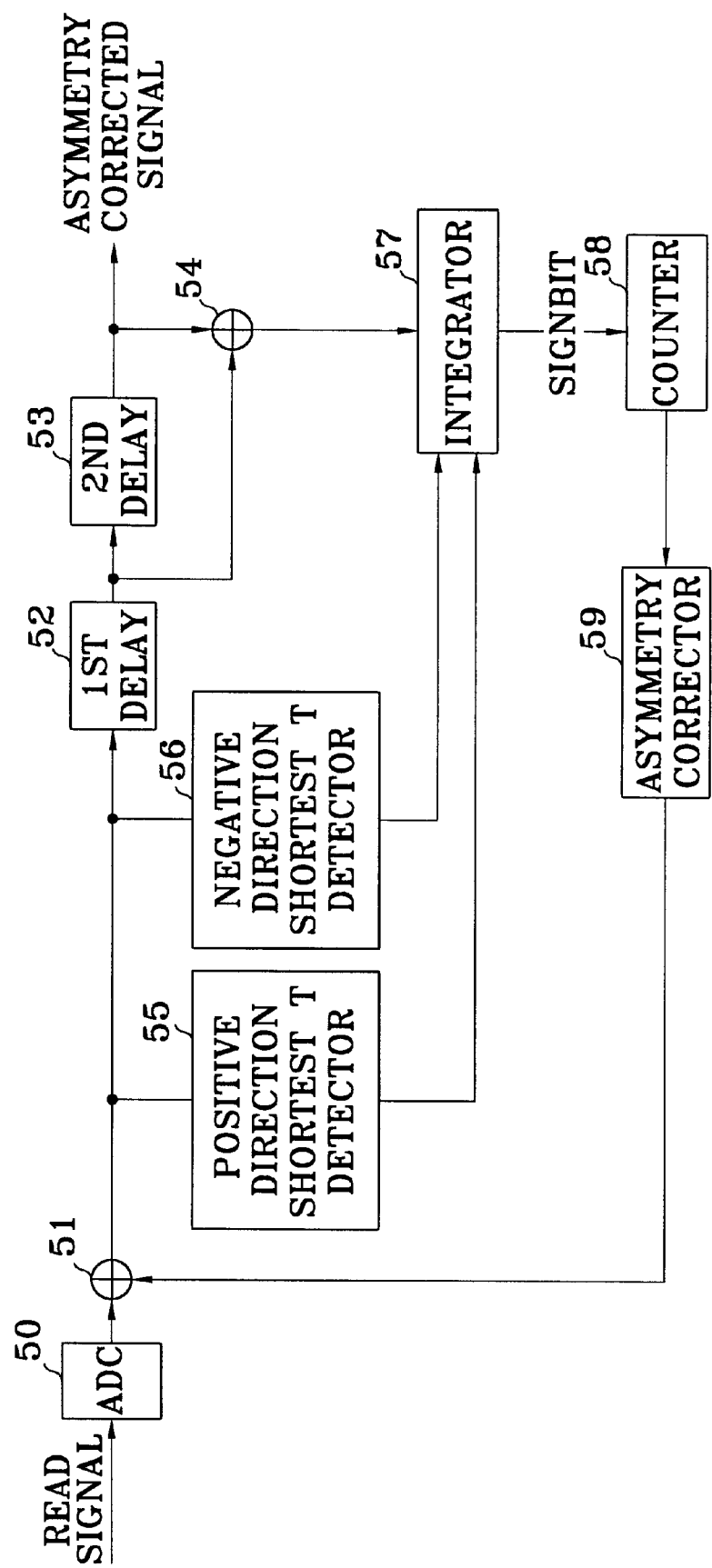
FIG. 5 is a block diagram showing an apparatus for correcting asymmetry of a reproduction signal through the shortest T detection according to a third embodiment of the present invention.
Figure 6:
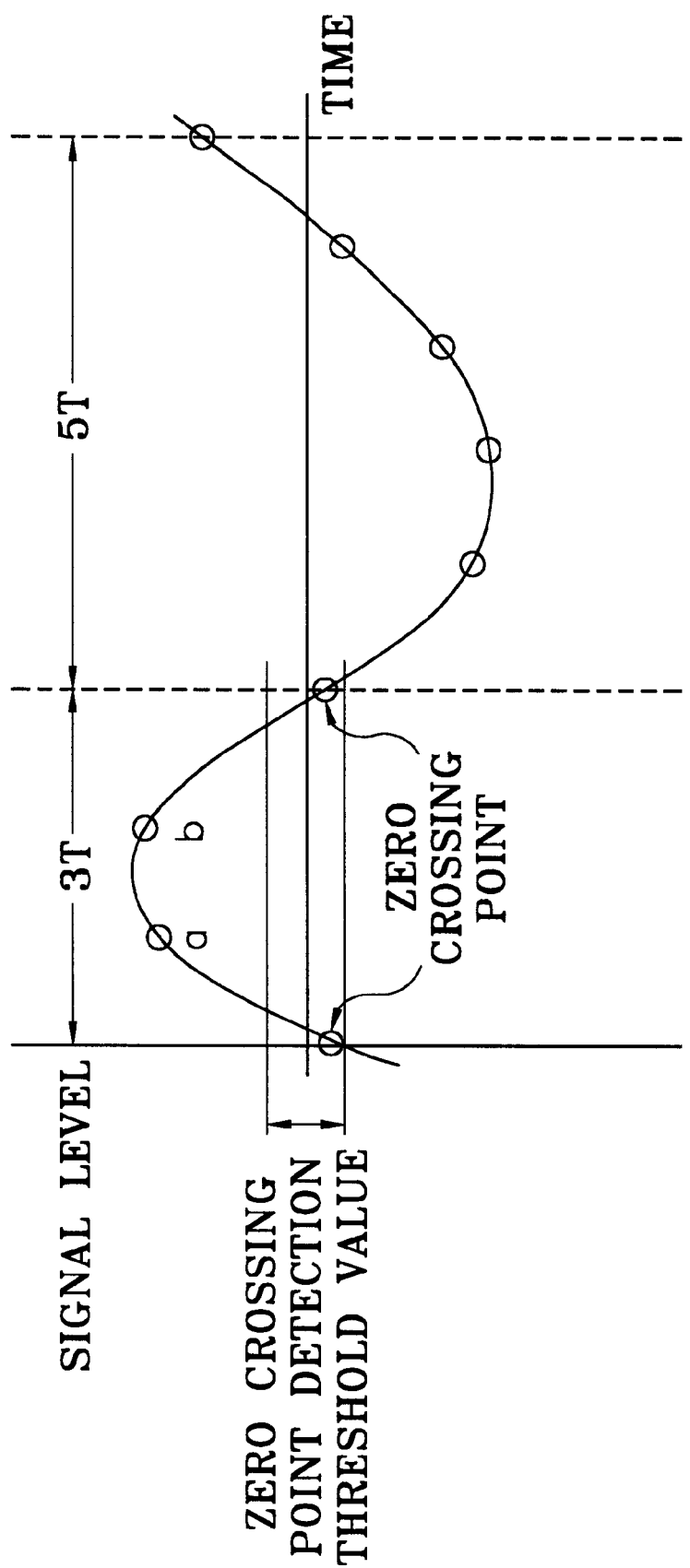
FIG. 6 is a graphical view showing that the correction apparatus of FIG. 5 detects +3T.

FIG. 5 is a block diagram showing an apparatus for correcting asymmetry of a reproduction signal through the shortest T detection according to a third embodiment of the present invention. The FIG. 5 correction apparatus detects 3T of a positive (+) direction and 3T of a negative (−) direction by the shortest T. Here, T is defined as interval of a bit. FIG. 6 is a graphical view showing that the correction apparatus of FIG. 5 detects +3T.

In FIG. 5, an ADC 50 receives a signal read from an optical disc (not shown) and converts the same to digital form to then output a digital conversion signal. A first adder 51 adds the digital conversion signal output from the ADC 50 and a predetermined fedback asymmetry correction value. The first adder 51 outputs the added result to a first delay 52, a positive (+) direction shortest T detector 55 and a negative (−) direction shortest T detector 56. The first delay 52 delays the added result by a first predetermined time and outputs the result to a second delay 53 and a second adder 54. The second delay 53 delays the delayed result from the first delay 52 by a second predetermined time and outputs the result to a signal detector (not shown) and the second adder 54 as an asymmetry corrected signal. The second adder 54 adds the delayed result in the first delay 52 and the result delayed by the second delay 53. That is, the second adder 54 adds signals a and b except for the zero crossing point in the case that the shortest T is 3T as shown in FIG. 6. The second adder 54 outputs the added signal to an integrator 57.

The positive direction shortest T detector 55 and the negative direction shortest T detector 56 detect whether the signal input from the first adder 51 is a positive 3T or a negative 3T. Here, the positive direction shortest T detector 55 and the negative direction shortest T detector 56 recognize zero crossing points according to the threshold values set in order to detect the zero crossing points as shown in FIG. 6. The positive direction shortest T detector 55 and the negative direction shortest T detector 56 output a first detection result and a second detection result to the integrator 57, respectively, if the input signal is detected as a positive 3T or a negative 3T. The integrator 57 accumulates the added signal applied from the second adder 54, if the second detection result is applied immediately after the first detection result has been applied, or if the first detection result is applied immediately after the second detection result has been applied. The integrator 57 updates the added signal applied from the second adder 54 into an added signal according to the secondly applied first detection result or the secondly applied second detection result, if the first detection result is applied again after the first detection result has been applied, or if the second detection result is applied again after the second detection result has been applied. The integrator 57 outputs the sign bit of an accumulated added signal to a counter 58.

The counter 58 increases a counted value when the sign bit input from the integrator 57 is positive (+), and decreases the former when the latter is negative (−). The counter 58 is reset if an absolute value of the counted value is larger than a predetermined threshold value. In this case, it is judged that asymmetry correction is needed. Here, the threshold value is changed and set according to the level of the signal input to the ADC 50 and becomes a reference value for asymmetry correction. If a central value of the signal to be input to the ADC 50 is not the same as the level of the signal "0," the threshold value is changed and set as the central value thereof. The counter 58 outputs a control signal for increasing and decreasing an asymmetry correction value to an asymmetry corrector 59 if an absolute value of the counted value is larger than the threshold value. Here, if the sign of the counted value is positive (+), the counter 58 outputs a control signal for decreasing the asymmetry correction value to the asymmetry corrector 59, while if the sign of the counted value is negative (−), the counter 58 outputs a control signal for increasing the asymmetry correction value to the asymmetry corrector 59.

The asymmetry corrector 59 increases and decreases the asymmetry correction value according to the control signal applied from the counter 58 and feeds the result back to the first adder 51. Here, the initial asymmetry correction value of the asymmetry corrector 59 is zero. Also, the asymmetry corrector 59 can be possibly reset and held at defective intervals or blank intervals of an optical disc.

The first adder 51 adds the signal output from the ADC 50 and the asymmetry correction value fedback from the asymmetry corrector 59. Accordingly, the signals which are continuously read from the optical disc are asymmetry-corrected in the asymmetry correction apparatus.

Figure 7:
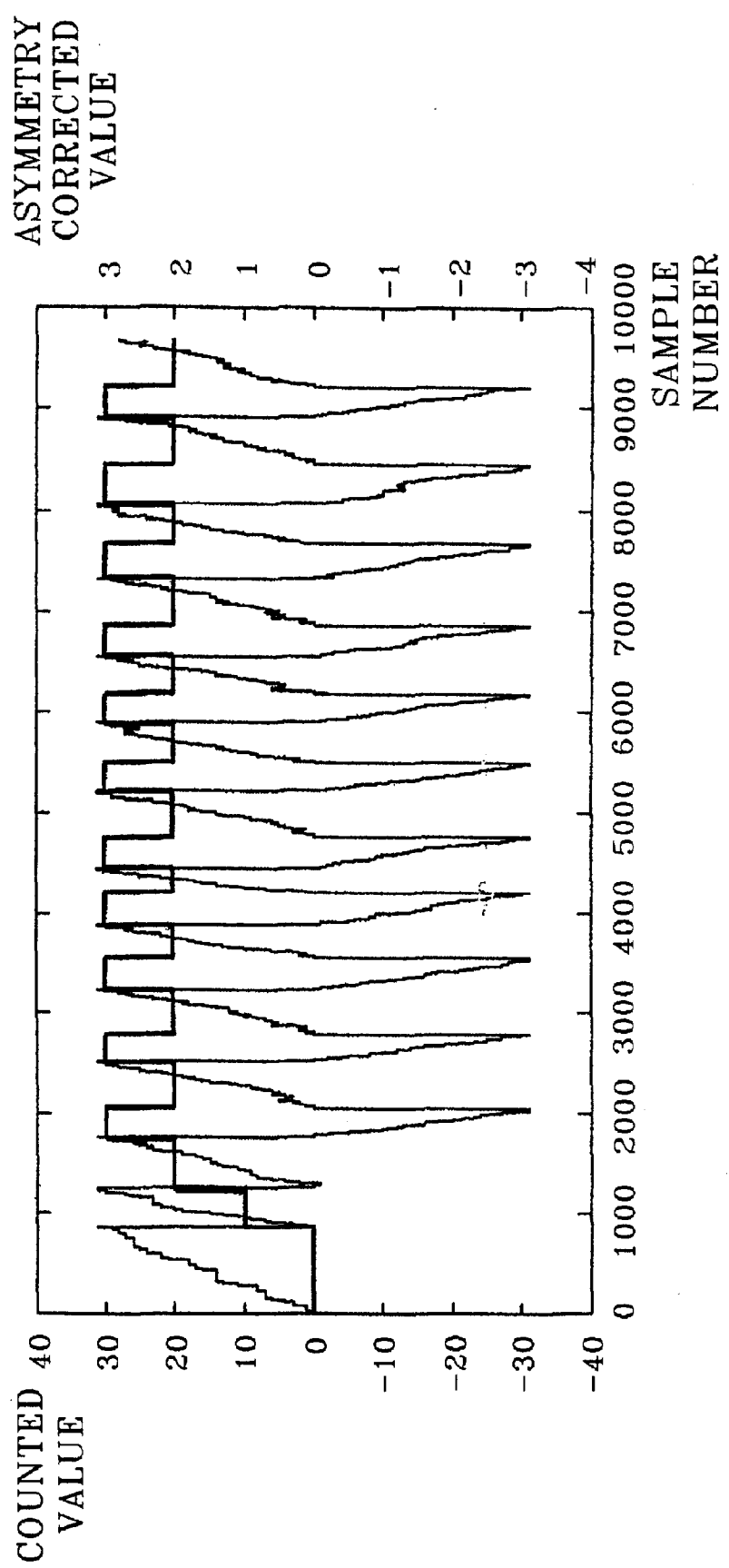
FIG. 7 is a graphical view showing counter values and asymmetry correction values according to the apparatuses shown in FIGS. 3 through 5.

FIG. 7 is a graphical view showing counter values and asymmetry correction values according to the apparatuses shown in FIGS. 3 through 5. A thick solid line waveform indicates an asymmetry corrected value, and a thin solid line waveform indicates a counter value. Since asymmetry occurs in the negative (31) direction, it can be seen that asymmetry correction has been accomplished in a positive (+) direction.

Figure 8:
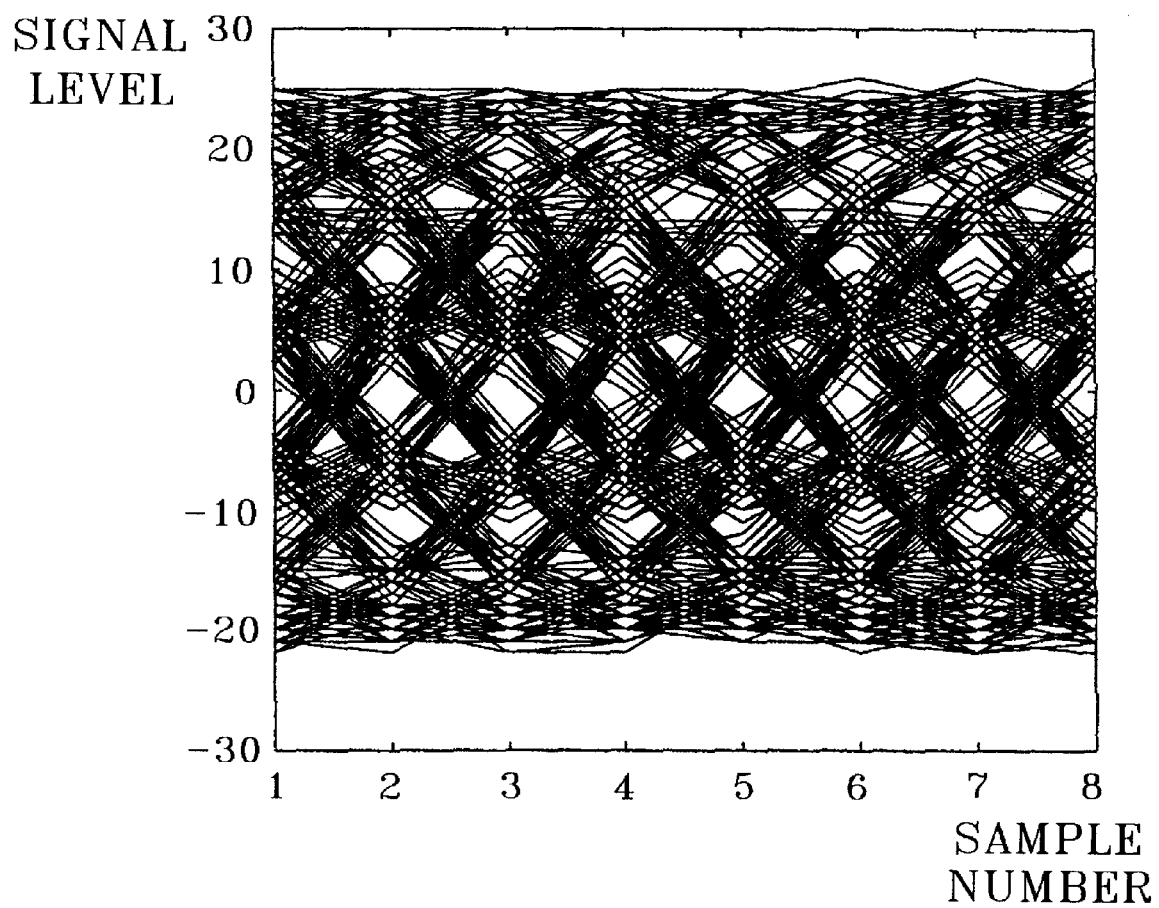
FIG. 8 shows a reproduction signal whose asymmetry has been corrected by the present invention apparatus, with respect to the reproduction signal where the asymmetry of FIG. 1 exists.

FIG. 8 shows a reproduction signal whose asymmetry has been corrected by the present invention apparatus, in contrast to the reproduction signal where the asymmetry of FIG. 1 exists. As shown in FIG. 8, it can be seen that the central value of the asymmetry corrected reproduction signal is identical to a signal level "0."

As described above, the asymmetry correction apparatus according to the present invention corrects asymmetry with respect to the signals read from the optical disc in digital form. The asymmetry correction apparatus according to the present invention changes the threshold values for counting the sign bits of the reproduction signal and the asymmetry correction values although discontinuous intervals exist on the optical disc, thereby providing an effect of easily varying an adaptive speed with respect to the discontinuous signal.

What is claimed is:

1. A reproduction signal asymmetry correction apparatus for correcting asymmetry existing in a reproduction signal to be reproduced from an optical disc, the asymmetry correction apparatus comprising:

a signal converter which converts the reproduction signal to a digital converted signal;

an adder unit which adds the digital converted signal and a feedback asymmetry correction signal and, in response, outputs an added signal as an asymmetry corrected signal;

a counter unit which performs a counting operation based on the added signal output from said adder unit, and in response outputs an asymmetry correction control signal to control asymmetry correction; and an asymmetry corrector which adjusts the feedback asymmetry correction signal according to the asymmetry correction control signal.

2. The reproduction signal asymmetry correction apparatus as claimed in claim 1, wherein said counter unit comprises:

a counter which receives the added signal, performs the counting operation based on the added signal, compares a counted value with a threshold value, and outputs the asymmetry correction control signal according to the comparison.

3. The reproduction signal asymmetry correction apparatus as claimed in claim 2, wherein said counter receives a sign bit of the added signal output from said adder unit and performs the counting operation with respect to the sign bit.

4. The reproduction signal asymmetry correction apparatus as claimed in claim 3, wherein:

said counter increases the counted value if the sign bit of the added signal output from said adder unit is positive and decreases the counted value if the sign bit is negative;

said counter is reset if an absolute value of the counted value is larger than the threshold value; and said counter outputs the asymmetry correction control signal to decrease the feedback asymmetry correction signal to said asymmetry corrector if a sign of the counted value is positive and outputs the asymmetry correction control signal to increase the feedback asymmetry correction signal to said asymmetry corrector if the sign of the counted value is negative, when a absolute value of the counted value is larger than the threshold value.

5. The reproduction signal asymmetry correction apparatus of claim 1, wherein said counter unit comprises:

a first delay which delays the added signal output from said adder unit by a first predetermined time and outputs a first delayed signal;

a second delay which delays the first delayed signal by a second predetermined time and outputs a second delayed signal as the asymmetry corrected signal;

an adder which adds the added signal output from said adder unit and the second delayed signal output from said second delay, to generate a second added signal;

a zero crossing point detector which detects a zero crossing point of the first delayed signal output from said first delay and to generate a counting operation control signal when a zero crossing point is detected; and a counter which receives the counting operation control signal and performs a counting operation of the second added signal when the counting operation control signal is received from said zero crossing point detector to generate the counted value, compares the counted value with a threshold value, and outputs the asymmetry correction control signal to said asymmetry corrector according to the comparison.

6. The reproduction signal asymmetry correction apparatus as claimed in claim 5, wherein said counter receives a sign bit of the second added signal output from said adder and performs the counting operation of the sign bit.

7. The reproduction signal asymmetry correction apparatus as claimed in claim 6, wherein:

said counter increases the counted value if the sign bit of the second added signal output from said adder is positive and decreases the counted value if the sign bit is negative;

said counter is reset if an absolute value of the counted value is larger than the threshold value; and said counter outputs the asymmetry correction control signal to decrease the asymmetry correction signal to said asymmetry corrector if a sign of the counted value is positive and outputs the asymmetry correction control signal to increase the asymmetry correction signal to said asymmetry corrector if the sign of the counted value is negative, when the absolute value of the counted value is larger than the threshold value.

8. The reproduction signal asymmetry correction apparatus of claim 1, wherein said counter unit comprises:

a first delay which delays the added signal output from said adder unit by a first predetermined time;

a second delay which delays the first delayed signal output from said first delay by a second predetermined time and outputs the second delayed signal as the asymmetry corrected signal;

an adder which adds the first delayed signal output from said first delay and the second delayed signal output from said second delay, to generate a second added signal;

a shortest T detector which detects a shortest T with respect to the added signal output from said adder unit, to generate a detection result if the shortest T has been detected;

an integrator which performs at least one of an accumulation operation and an updating operation to the second added signal output from said adder according to the detection result from said shortest T detector and outputs an accumulated signal according to the accumulation operation; and a counter which performs a counting operation of the accumulated signal from said integrator and generates a counted value, compares the counted value with a threshold value, and outputs the asymmetry correction control signal to said asymmetry corrector according to the comparison.

9. The reproduction signal asymmetry correction apparatus as claimed in claim 8, wherein said shortest T detector comprises:

a positive (+) direction shortest T detector which detects whether the added signal output from said adder unit is a positive (+) direction shortest T, and if the positive direction shortest T has been detected, outputs a first detection result to said integrator; and a negative (−) direction shortest T detector which detects whether the added signal output from said adder unit is a negative (−) direction shortest T, and if the negative direction shortest T has been detected, outputs a second detection result to said integrator.

10. The reproduction signal asymmetry correction apparatus as claimed in claim 9, wherein said integrator performs the accumulation operation to the second added signal in response to the second detection result being received from said negative direction shortest T detector immediately after the first detection result is received from said positive direction shortest T detector or in response to the first detection result received from said positive direction shortest T detector immediately after the second detection result is received from said negative direction shortest T detector, and said integrator performs the updating operation to the second added signal received from said adder in response to the first detection result being received immediately after the first detection result is received from said positive direction shortest T detector or in response to the second detection result being received immediately after the second detection result is received from said negative direction shortest T detector.

11. The reproduction signal asymmetry correction apparatus as claimed in claim 8, wherein said counter receives a sign bit of the accumulated signal output from said integrator and performs the counting operation of the sign bit.

12. The reproduction signal asymmetry correction apparatus as claimed in claim 11, wherein:

said counter increases the counted value if the sign bit of the accumulation signal output from said integrator is positive and decreases the counted value if the sign bit of the accumulation signal is negative;

said counter is reset if an absolute value of the counted value is larger than the threshold value; and said counter outputs the asymmetry corrected control signal to decrease the asymmetry correction signal to said asymmetry corrector if the sign of the counted value is positive and outputs the asymmetry corrected control signal to increase the asymmetry correction signal to said asymmetry corrector if the sign of the counted value is negative, when the absolute value of the counted value is larger than the threshold value.

13. The reproduction signal asymmetry correction apparatus as claimed in claim 1, wherein said asymmetry corrector initially outputs an asymmetry correction signal with a value of zero to said adder unit prior to adjustment.

14. The reproduction signal asymmetry correction apparatus as claimed in claim 1, wherein said asymmetry corrector is reset and held at defective intervals or blank intervals of the optical disc.

15. The reproduction signal asymmetry correction apparatus as claimed in claim 2, wherein the threshold value varies according to a level of the reproduction signal.

16. An apparatus for correcting asymmetry of an optical disk digital reproduction signal, comprising:

a first circuit which adds the digital reproduction signal to a digital offset signal and outputs a digital asymmetry corrected signal;

a second circuit which adjusts the digital offset signal based on a sign bit history of the digital asymmetry corrected signal.

17. The apparatus for correcting asymmetry as claimed in claim 16, further comprising a counter which receives the asymmetry corrected signal and determines the sign bit history by counting sign bits of the asymmetry corrected signal.

18. The apparatus for correcting asymmetry as claimed in claim 17, wherein the counter increases a counter output value when a sign bit of the asymmetry corrected signal represents a positive value and decreases the counter output value when the sign bit of the asymmetry corrected signal represents a negative value.

19. The apparatus for correcting asymmetry as claimed in claim 18, wherein the second circuit adjusts the digital offset signal when an absolute value of the counter output value exceeds a threshold value.

20. The apparatus for correcting asymmetry as claimed in claim 19, wherein if the counter output value is negative, the second circuit increases the digital offset signal.

21. The apparatus for correcting asymmetry as claimed in claim 19, wherein if the counter output value is positive, the second circuit decreases the digital offset signal.

22. The apparatus for correcting asymmetry as claimed in claim 19, wherein the second circuit resets the counter output value to zero when the threshold value is exceeded.

23. An apparatus for correcting asymmetry of an optical disk digital reproduction signal, comprising:

a first circuit which adds the digital reproduction signal and a digital offset signal and outputs a digital asymmetry corrected signal and a digital signal derived from the asymmetry corrected signal;

a second circuit which adjusts the digital offset signal based on a sign bit history of the derived digital signal.

24. The apparatus for correcting asymmetry as claimed in claim 23, wherein the second circuit further comprises a counter which receives the derived digital signal and determines the sign bit history by counting sign bits of the derived digital signal.

25. The apparatus for correcting asymmetry as claimed in claim 24, wherein the counter further comprises a control terminal which controls which sign bits are counted.

26. The apparatus for correcting asymmetry as claimed in claim 23, wherein the first circuit further comprises:

a first delay which delays the asymmetry corrected signal;

a second delay which delays the first delayed asymmetry corrected signal; and an adder which outputs a sum of the first delayed asymmetry corrected signal and the second delayed asymmetry corrected signal as the derived digital signal.

27. The apparatus for correcting asymmetry as claimed in claim 25, wherein the first circuit further comprises:

a delay which delays the asymmetry corrected signal; and a zero crossing point detector which detects zero crossing points of the delayed corrected signal and outputs a zero crossing signal to the control terminal of the counter when one of the zero crossing points is detected.

28. The apparatus for correcting asymmetry as claimed in claim 27, wherein the counter counts sign bits of the derived digital signal when the zero crossing point signal is received.

29. The apparatus for correcting asymmetry as claimed in claim 28, wherein the counter increases a counter output value when the sign bit of the derived digital signal represents a positive value and decreases the counter output value when the sign bit of the derived digital signal represents a negative value.

30. The apparatus for correcting asymmetry as claimed in claim 28 wherein the second circuit adjusts the digital offset signal when an absolute value of the counter output value exceeds a threshold value.

31. The apparatus for correcting asymmetry as claimed in claim 30, wherein if counter output value is negative, the second circuit increases the digital offset signal.

32. The apparatus for correcting asymmetry as claimed in claim 30, wherein if the counter output value is positive, the second circuit decreases the digital offset signal.

33. The apparatus for correcting asymmetry as claimed in claim 30 wherein the second circuit resets the counter output value to zero when the threshold value is exceeded.

34. The apparatus for correcting asymmetry as claimed in claim 23, wherein the first circuit further comprises:

a first delay which delays the asymmetry corrected signal;

a second delay which delays the first delayed corrected signal; and an adder which outputs a sum of the first delayed corrected signal and the second delayed corrected signal as a summed digital signal.

35. The apparatus for correcting asymmetry as claimed in claim 34, wherein the first circuit further comprises:

positive and negative direction shortest T detectors which receive the digital asymmetry corrected signal and output positive and negative direction shortest T control signals, respectively; and an integrator which receives the summed digital signal and accumulates the summed digital signal when a first one of the positive direction shortest T control signals and a first one of the negative direction shortest T control signals are received sequentially or a first one of the negative direction shortest T control signals and a first one of the positive direction shortest T control signals are received sequentially, and outputs the accumulated digital signal as the derived digital signal according to a last received shortest T control signal when either a second one and a third one of the positive direction shortest T control signal are received sequentially or a second one and a third one of the negative direction shortest T control signals are received sequentially.

36. A method of correcting asymmetry of an optical disk digital reproduction signal, comprising:

adding the digital reproduction signal to a digital offset signal and outputting a digital corrected asymmetry signal; and adjusting the digital offset signal based on a sign bit history of a digital signal derived from the digital corrected asymmetry signal.

37. The method of correcting asymmetry as claimed in claim 36, further comprising: determining the sign bit history by counting sign bits of the derived digital signal.

38. The method of correcting asymmetry as claimed in claim 37 further comprising increasing a bit count when the sign bit of the derived digital signal represents a positive value and decreasing the bit count when the sign bit of the derived digital signal represents a negative value.

39. The method of correcting asymmetry as claimed in claim 36, wherein the derived digital signal and the digital corrected asymmetry signal are equal.

40. The method of correcting asymmetry as claimed in claim 36, further comprising:

delaying the digital asymmetry corrected signal by first and second predetermined times;

adding the digital asymmetry corrected signal and the second delayed digital asymmetry corrected signal and outputting the derived digital signal; and detecting a zero crossing point of the first delayed digital asymmetry corrected signal and counting sign bits of the derived digital signal when the zero crossing point is detected.

41. The method for correcting asymmetry as claimed in claim 37, further comprising:

generating positive and negative direction shortest T control signals based on the digital asymmetry corrected signal;

delaying the digital asymmetry corrected signal by first and second predetermined times;

adding the first delayed digital asymmetry corrected signal and the second delayed digital asymmetry corrected signal and outputting a summed digital signal; and accumulating the summed digital signal and outputting the accumulated digital signal to the sign bit counter as the derived digital signal.

42. The method for correcting asymmetry as claimed in claim 41, further comprising accumulating the summed digital signal when a first one of the positive direction shortest T control signals and a first one of the negative direction shortest T control signal are received sequentially or a first one of the negative direction shortest T control signals and a first one of the positive direction shortest T control signals are received sequentially.

43. The method for correcting asymmetry as claimed in claim 42, further comprising counting the sign bit of the accumulated digital signal according to a last received one of the shortest T control signals when either a second one and a third one of the positive direction shortest T control signals are received sequentially or a second one and a third one of the negative direction shortest T control signals are received sequentially.

* * * * *